United States Patent [19]

Wells et al.

[11] 4,111,234
[45] Sep. 5, 1978

[54] REPAIR DEVICE FOR PIPES

[76] Inventors: James W. Wells, Rte. 1, Box 771, Elmore, Ala. 36025; Loyd A. Watts, Rte. 2, Box 303, Wartrace, Tenn. 37183

[21] Appl. No.: 740,942

[22] Filed: Nov. 11, 1976

[51] Int. Cl.² .................. F16L 55/16; F16L 55/18
[52] U.S. Cl. .................................. 138/99; 138/167
[58] Field of Search ............... 138/99, 167; 285/45, 285/373, 419

[56] References Cited

U.S. PATENT DOCUMENTS

| | | | |
|---|---|---|---|
| 158,554 | 1/1875 | Whitcomb | 138/99 |
| 549,594 | 11/1895 | Cooper et al. | 285/112 X |
| 799,623 | 9/1905 | Augensen | 138/99 |
| 1,160,284 | 11/1915 | Headly | 138/99 X |
| 1,618,234 | 2/1927 | Skinner | 138/99 X |
| 1,831,641 | 11/1931 | Skinner | 285/379 X |
| 2,417,741 | 3/1947 | Dillon | 138/99 X |
| 2,899,984 | 8/1959 | Gaffin | 138/99 |

FOREIGN PATENT DOCUMENTS

| | | | |
|---|---|---|---|
| 762,071 | 4/1934 | France | 138/99 |
| 53,786 | 11/1889 | Fed. Rep. of Germany | 138/99 |
| 257,821 | 10/1948 | Switzerland | 138/99 |
| 740,433 | 11/1955 | United Kingdom | 138/99 |
| 8,140 of | 1894 | United Kingdom | 285/373 X |
| 790,109 | 2/1958 | United Kingdom | 285/373 |

*Primary Examiner*—Richard E. Aegerter
*Assistant Examiner*—James E. Bryant, III
*Attorney, Agent, or Firm*—Brady, O'Boyle & Gates

[57] ABSTRACT

A permanent repair clamp for pipes is adapted to be installed over a single or double ended pipe bell in a range of sizes. The device essentially comprises separately formed opposing clamp sections or body portions of semi-cylindrical formation with leak-proof interface gasketing between the clamp sections and between such sections and the pipe on which the device is installed. A spanning type arcuate connector or connector sections interlocks rigidly and positively with one side of one clamp section and is adjustably connected rigidly with the same clamp section at approximately the opposite diametrical side thereof, whereby the two clamp sections may be effectively and permanently secured in sealing relationship to a leaking pipe.

10 Claims, 8 Drawing Figures

U.S. Patent  Sept. 5, 1978  Sheet 1 of 2  4,111,234
FIG. 1
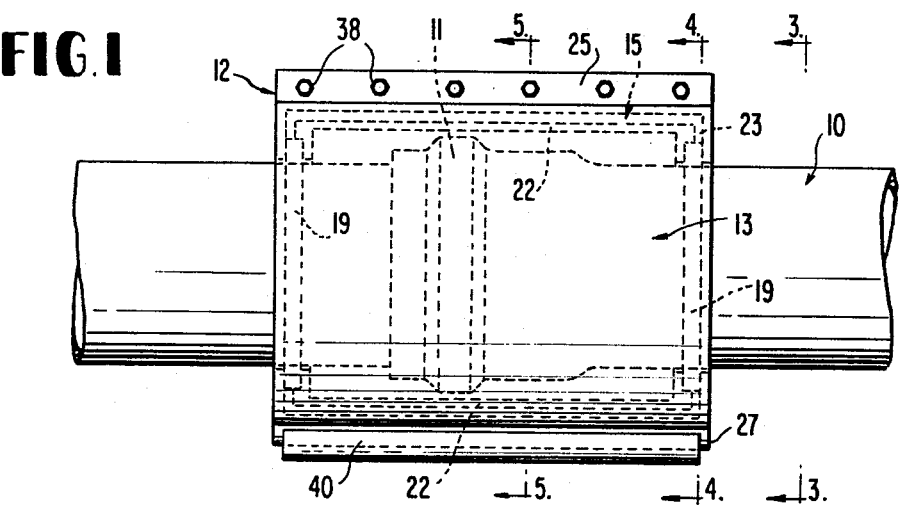
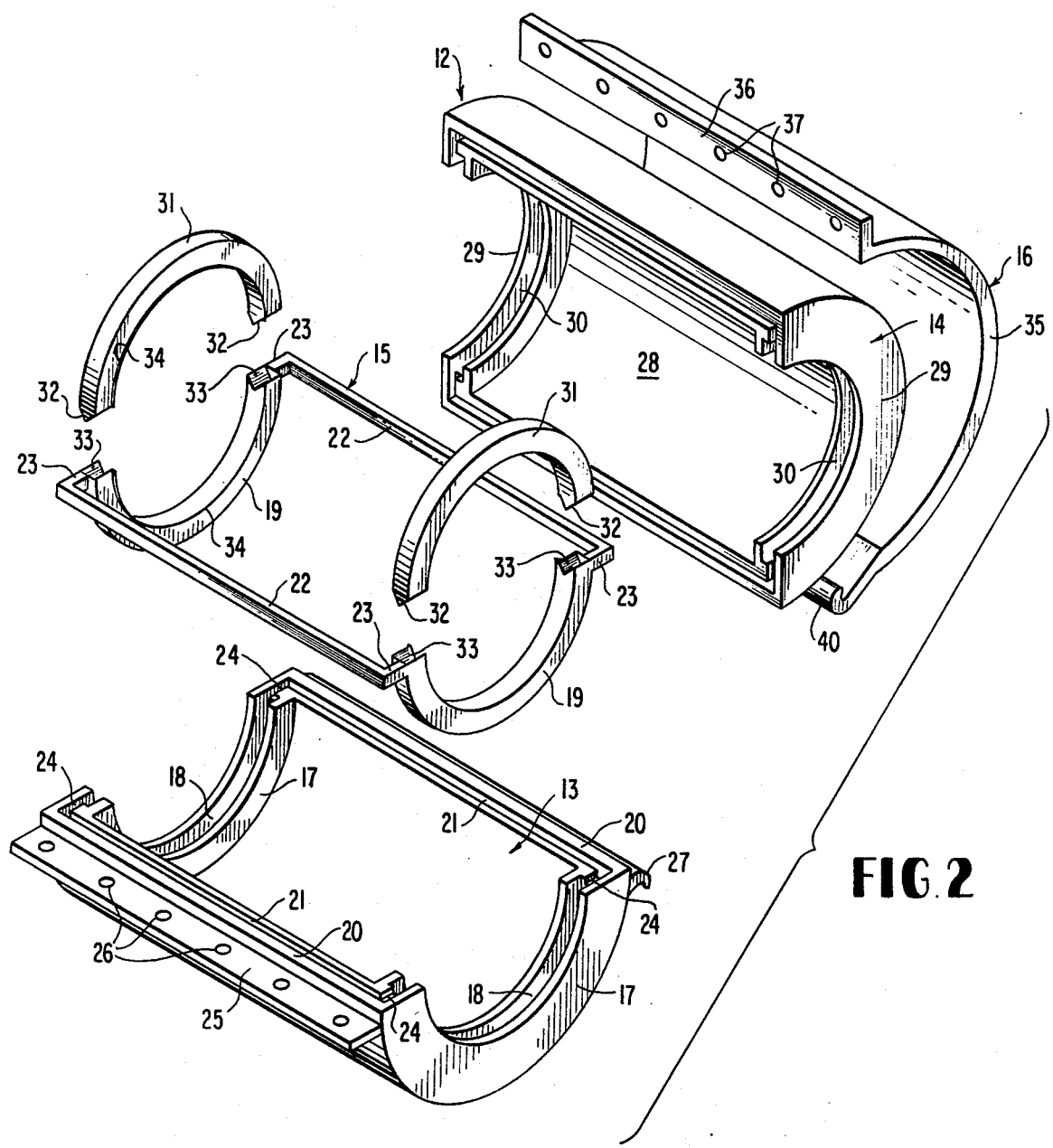
FIG. 2

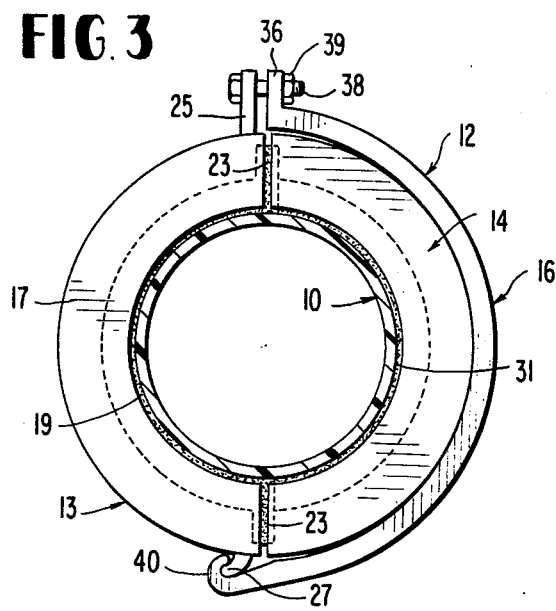
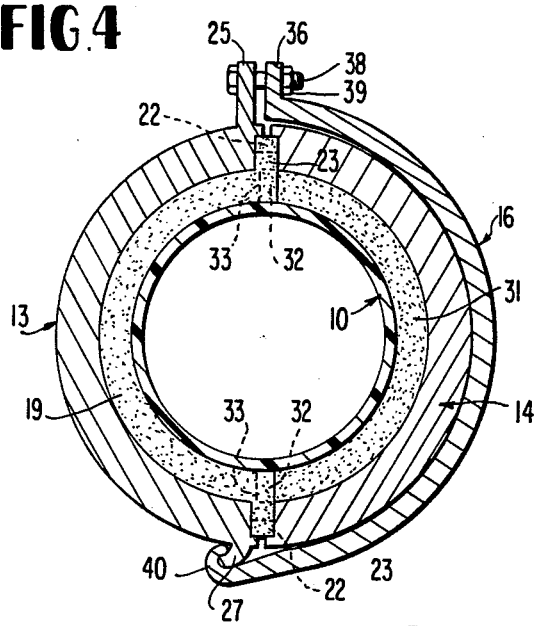
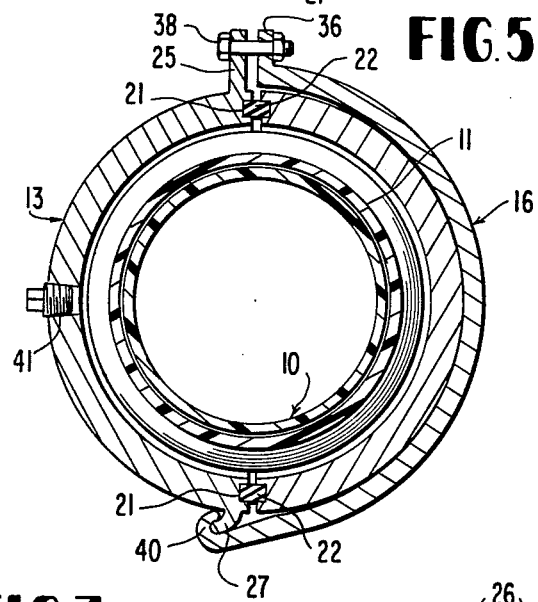
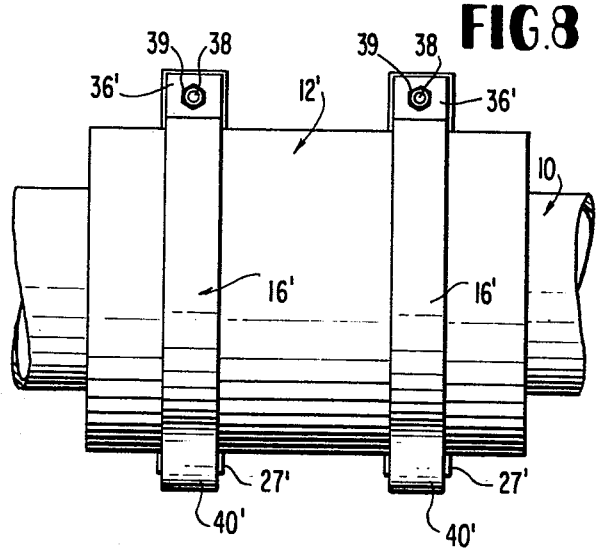
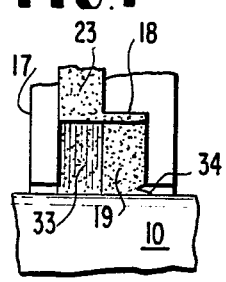
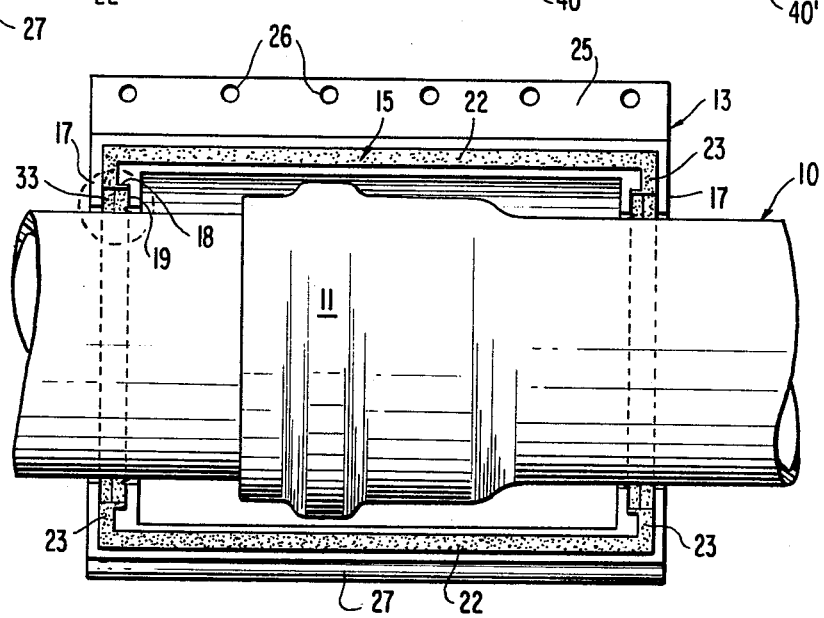

REPAIR DEVICE FOR PIPES

BACKGROUND OF THE INVENTION

Various proposals exist in the prior art for the coupling and/or repair of pipes. Some pertinent examples of the patented prior art are contained in U.S. Pat. Nos. 1,831,641; 3,464,722; 3,006,663; 2,913,262 and 2,778,662.

In spite of the developments in the art pertaining to pipe repair means, a need continues to exist for an improved, simplified, economical and more efficient repair device for pipes including plastic pipes (PVC and the like) as well as other types of pipes. More particularly, there is a need for a pipe repair unit which may be applied to a leaking pipe around a single or double ended pipe bell to permanently stop leakage while the existing pipe remains in service under some pressure and without the necessity for severing the pipe during the repair operation. There is a need for a pipe repair means which may be installed around a leaking pipe or pipe bell without interrupting water flow through the pipe and thus preventing inflow of contaminating substances during the repair operation, and avoiding the necessity to flush the pipe line or rechlorinate following the repair.

The objective of the present invention is to provide a permanent pipe repair clamp or device which will fully satisfy all of the above needs through the provision of a very simple, easy to install, permanent repair clamp for leaking pipes which includes a very secure and positive connecting means between the opposing half sections of the clamp, which cannot loosen or lose part of its clamping tension once properly installed, as can sometimes occur with other forms of connecting means.

Other important features and advantages of the invention over the known prior art will appear during the course of the following detailed description.

BRIEF DESCRIPTION OF THE DRAWINGS

FIG. 1 is a side elevational view of a permanent repair device for pipes shown installed over a single ended bell of a leaking pipe.

FIG. 2 is an exploded perspective view of the device.

FIG. 3 is an end elevational view, partly in section, taken on line 3—3 of FIG. 1.

FIG. 4 is a transverse vertical section taken on line 4—4 of FIG. 1.

FIG. 5 is a similar section taken on line 5—5 of FIG. 1.

FIG. 6 is a side elevational view, similar to FIG. 1, with one half-section of the clamp and the connecting member removed.

FIG. 7 is an enlarged fragmentary elevational view of the area in FIG. 6 encircled by a phantom line.

FIG. 8 is a side elevational view of the invention according to a modification.

DETAILED DESCRIPTION

Referring to FIGS. 1 through 7 in detail showing a preferred form of the invention, wherein like numerals designate like parts, an existing pipe line 10 having a coupling bell 11 between adjacent pipe sections is illustrated. As has been noted, the repair device is adapted to be installed over a pipe bell or in some cases could be installed over a straight section of pipe which might have a crack or other defect causing a leak. The invention while particularly useful with PVC pipe finds equal utility with all forms of pipe. The entire repair device may, if desired, be made from molded plastics material including the securing bolts, or may be formed of metal or other appropriate material.

The repair clamp or device proper designated in its entirety by the numeral 12 comprises two separately formed semi-cylindrical clamp half sections 13 and 14 which together make up the body portion of the repair clamp when the device is installed. Compressible gasketing 15 formed of rubber-like material is employed between the interfaces of the clamp sections 13 and 14 and between the ends of the clamp and the pipe 10, as will be described in detail. The final major component of the device is an arcuate spanner-type connector 16 formed separately from the clamp sections 13 and 14 and coacting therewith to very securely and positively connect the clamp sections in firm clamping relationship with the pipe. This clamp securing or connecting means forms a very important feature of the invention which will also be fully described.

Continuing to refer to the drawings, the semi-cylindrical clamp section 13 has integral semi-circular end walls 17 which are grooved at 18 to receive semi-circular sections 19 of the gasketing or seal 15. The parallel longitudinal edge faces 20 of clamp section 13 are also grooved at 21 to receive parallel longitudinal branches 22 of the gasketing 15, which branches have short transverse end extensions 23 joined to the ends of the semi-circular sections 19 of the gasketing. The gasketing elements 19, 22 and 23 are integrally joined, as shown in FIG. 2. The end walls 17 have short groove sections 24 of reduced width leading from the ends of the arcuate grooves 18 for the reception of the short transverse sections 23 of the gasketing.

The clamp half section 13 is provided along one side thereof slightly below the adjacent edge face 20 with an integral continuous rigid flange plate 25 having a plurality of equidistantly spaced apertures 26 formed therethrough. Similarly located on the opposite side of clamp section 13 is a continuous longitudinal rigid locking or engaging flange 27 whose purpose and function will be further described.

The opposing clamp half section 14 is similarly formed with a semi-cylindrical side wall 28 and a pair of integral end walls 29 of semi-circular formation and being grooved as at 30 to receive and seat a pair of semi-circular gasket sections 31 which are provided separately from the previously-described gasketing unit. The arcuate sections 31 have tapered ends 32 which wedge into tapering recesses or seats 33 formed in the opposite ends of the arcuate sections 19 of the gasketing to assure complete sealing of the clamp at all interface locations. Drawing FIGS. 3, 4 and 5 illustrate that the gasketing system is so arranged that the opposite ends of the device are effectively sealed with the pipe 10 and the device interfaces are also sealed at all points. For example, in FIG. 5, it is shown that the thickness of gasket branches 22 is sufficiently greater than the depth of grooves 21 to enable adequate sealing compression of the gasketing in the assembled and secured clamp or device. It is similarly shown in FIGS. 3 and 4 that the end arcuate gasket sections 19 and 31 are sufficiently wide radially to permit adequate compressive engagement with the pipe 10 when the repair device is installed, as well as wedging as well as wedging of the tapered ends 32 into the interfitting seats 33 when the device is assembled and fully secured on the pipe.

The sealing or gasketing system has a further feature, namely, the provision on the interior sides of arcuate sections 19 and 31 of tapered continuous sealing lips 34, see FIG. 7, which respond to back pressure inside of the device to more effectively grip and seal against the pipe 10.

The mentioned spanner-type connector 16 for securing the clamp half sections 13 and 14 positively in clamping engagement with the pipe 10 comprises a substantially semi-cylindrical wall 35 which extends for the full axial length of the clamp and entirely around the clamp section 14 circumferentially, FIG. 3. The connector 16 is substantially rigid and preferably contacts the peripheral face of semi-cylindrical clamp section 14 over a substantial surface area, as distinguished from a line of contact or narrow region of contact. One longitudinal edge of the connector 16 carries a continuous integral rigid radial flange plate 36 which is apertured at 37 to register with the apertures 26 of the spaced opposing flange plate 25. The apertures 26 and 37 receive adjustable through bolts 38 which provide a regulated constant and positive clamping force by the device on the pipe. This clamping force will not change after the device is properly installed and adjusted. Conventional lock washers or other thread locking means may be employed with the bolts 38 and their nuts 39. The remote longitudinal edge of arcuate connector 16 carries a continuous rigid hook-like knuckle 40 extending for the entire length of the connector and rigidly interlocking with the opposing locking flange 27 of clamp half section 13. With the parts assembled as described and with the two half sections placed around the pipe, as shown, the rigid elements 27 and 40 are engaged and the connector 16 is swung into place and the two flange plates 25 and 36 are bolted as described. The rather closely spaced bolts 38 distribute the clamping pressure and stresses evenly along the device for effective and permanent sealing.

The optional provision of a pressure relief plug 41 in one of the clamp sections 13 or 14 facilitates installing the device on a pipe having a pressure leak without interrupting fluid flow through the pipe. This procedure avoids service interruption and prevents infiltration of contaminants into the pipe line, as previously noted.

In a modification of the invention shown in FIG. 8, the device or repair clamp 12' is identical in all respects to the described clamp 12 except for the following. In lieu of the continuous unitary connector 16, two or more relatively narrow band connectors 16' are provided on the device, as shown in FIG. 8. Corresponding ends of these connectors 16' have radial flanges 36' and rigid knuckles 40' for the identical purpose described in connection with the elements 36 and 40 of the prior embodiment. The far side clamp half section in the modification of FIG. 8 has relatively narrow rigid engaging flanges 27' which coact with the knuckles 40' in the same manner and for the same purpose described in connection with the elements 27 and 40.

The terms and expressions which have been employed herein are used as terms of description and not of limitation, and there is no intention, in the use of such terms and expressions, of excluding any equivalents of the features shown and described or portions thereof but it is recognized that various modifications are possible within the scope of the invention claimed.

We claim:

1. A repair clamp for pipes and pipe couplings comprising a pair of rigid mating separately formed approximately semi-cylindrical clamp sections having arcuate end walls at opposite ends with interior faces defining openings of a diameter substantially less than the diameter of the semi-cylindrical clamp sections and engageable around a leaking pipe or pipe coupling to enclose and seal the pipe permanently in the region of the leak, said pair of semi-cylindrical clamp sections being of the same diameter as the arcuate end walls throughout the lengths thereof thereby adapted to form an enclosed cavity around a pipe, gasketing disposed at the interfaces of said clamp sections and at the interfaces of the interior faces of the end walls with the pipe to seal such interfaces, a radial flange on the exterior of one clamp section positioned at one longitudinal edge thereof and an interlocking engagement means on the opposite longitudinal edge thereof, an arcuate connector member separate from said clamp sections having an opposing radial flange on the exterior thereof on one longitudinal edge and a rigid interlocking engagement means substantially diametrically spaced therefrom adapted to interlock with said first mentioned interlocking engagement means on said one clamp section, said arcuate connector member extending substantially around the opposing clamp section circumferentially and engaging the circumferential face thereof substantially throughout its circumferential length in force transferring relationship, said opposing clamp section being free of radial flanges on both exterior longitudinal edges thereof, and adjustable connecting means between said radial flange on said one clamp half section and said opposing radial flange on said arcuate connector member, whereby said clamp is adapted to be clamped on a pipe by lateral swinging movement of said arcuate connector member about said interlocking engagement means and actuation of said adjustable connecting means.

2. A repair clamp for pipes as defined in claim 1, and said arcuate connector member being approximately semicylindrical and substantially covering the entire peripheral face of the clamp section around which it extends circumferentially.

3. A repair clamp for pipes as defined in claim 1, and said interlocking engagement means on the exterior of one clamp section comprising a rigid continuous engaging flange near one longitudinal edge thereof, and said rigid interlocking engagement means on said arcuate connector comprising a rigid interlocking continuous knuckle at the adjacent longitudinal side thereof.

4. A repair clamp for pipes as defined in claim 1, and said radial flange on the exterior of said one clamp section extending along the longitudinal edge thereof remote from said rigid interlocking engagement means, said opposing radial flange on said arcuate connector member extending along the adjacent longitudinal edge thereof, and said adjustable connecting means comprising spaced adjustable fastener means connecting said radial flanges.

5. A repair clamp for pipes as defined in claim 4, and said flanges being apertured at a plurality of spaced points, and said fastener means comprising threaded bolts engaging through registering apertures of the flanges.

6. A repair clamp for pipes as defined in claim 1, and said gasketing comprising longitudinal gasket sections between opposing longitudinal edges of said clamp sections and end arcuate gasket sections between arcuate end walls of the clamp sections and the periphery of a pipe on which the repair clamp is installed.

7. A repair clamp for pipes as defined in claim 6, and the opposing longitudinal edge faces of said clamp sections and the interior faces of said arcuate end walls being continuously grooved to accept said gasket sections to thereby form an uninterrupted compressible gasketing system at all interfaces of the repair clamp.

8. A repair clamp for pipes as defined in claim 6, and said end arcuate gasket sections formed in separate opposing approximately semi-circular halves and the opposing halves having interfitting wedge sealing terminal ends.

9. A repair clamp for pipes as defined in claim 1, and plural discontinuous spaced arcuate connector members for said clamp sections having rigid interlocking engagement with one clamp section and being adjustably connected with the same clamp section through said respective radial flanges and adjustable connecting means at its side diametrically opposite said rigid interlocking engagement means.

10. A repair clamp for pipes as defined in claim 9, and said interlocking engagement means and said rigid interlocking engagement means formed by the interengagement of spaced discontinuous engaging elements on said one clamp section and coacting spaced discontinuous spaced knuckles on said connector members.

* * * * *